United States Patent [19]
Simpkin et al.

[11] 4,011,359
[45] Mar. 8, 1977

[54] INTERLEAVING MATERIALS COMPRISING PARTICULATE SEPARATOR AND ACIDIC MATERIALS, FOR SEPARATING GLASS SHEETS

[75] Inventors: Gordon Thomas Simpkin, Ormskirk; Kenneth Ashcroft, Liverpool, both of England

[73] Assignee: Pilkington Brothers Limited, St. Helens, England

[22] Filed: Apr. 22, 1975

[21] Appl. No.: 570,314

[30] Foreign Application Priority Data
Apr. 25, 1974 United Kingdom ............. 18169/74

[52] U.S. Cl. .......................... 428/326; 260/17.4 R; 428/327; 428/438; 428/441
[51] Int. Cl.² ..................... B32B 17/08; C08L 1/02
[58] Field of Search ......... B32B/17/10; 260/17.4 R; 428/441, 438, 326, 327; 252/11

[56] References Cited
UNITED STATES PATENTS
3,723,312   3/1973   Hay ..................................... 252/11

FOREIGN PATENTS OR APPLICATIONS
861,578   2/1961   United Kingdom ................ 252/11

*Primary Examiner*—Edward M. Woodberry
*Attorney, Agent, or Firm*—Sughrue, Rothwell, Mion, Zinn & Macpeak

[57] ABSTRACT

An interleaving material for separating glass sheets and protecting them from scratching and staining during storage or transit comprises a porous finely divided support material, such as wood flour, impregnated with a weakly acidic material such as an organic acid (e.g. adipic acid) or an acid reacting salt, and fine particles of a chemically inert plastics material, e.g. a methyl methacrylate, preferably of slightly larger particle size than the acid-impregnated support material.

25 Claims, No Drawings

INTERLEAVING MATERIALS COMPRISING PARTICULATE SEPARATOR AND ACIDIC MATERIALS, FOR SEPARATING GLASS SHEETS

BACKGROUND OF THE INVENTION

1. Field of the Invention

This invention relates to interleaving materials for separating glass sheets and protecting them from scratching and straining, and to a process for protecting such glass sheets during storage or transport, particularly when stacked in conventional manner. References in this specification to "stacked glass sheets" or to a "stack of glass sheets" are to be understood to refer to an assemblage of a plurality of glass sheets whose major surfaces are in adjacent face-to-face relationship, irrespective of whether those major surfaces are disposed horizontally or vertically or in an intermediate inclined position.

During storage and transit, stacked glass sheets are liable to deteriorate in two principal ways, particularly if they are allowed to come into contact with one another. Relative movement between adjacent sheets is liable to cause scratching of the adjacent glass surfaces. There is also a tendency for a stain to develop on the facing glass surfaces of adjacent sheets, particularly in hot, humid conditions. Staining is thus a particular problem in climates where such conditions are common, but it can also be a significant problem in more temperate climates.

2. Description of the Prior Art

It is known to protect stacked glass sheets from scratching by disposing paper sheets or powder, for example a powder formed of small plastics beads or of wood flour, between adjacent glass sheets. Such paper sheets and powder are known as "interleaving materials". It has also been proposed in British patent specification No. 861,578 to protect sheet glass against iridescence (i.e. staining) by the use of a slightly acid agent (preferably sodium bisulphate but alternatively another acid reacting salt or even a weak acid such as citric acid) which may be incorporated by absorption into or adsorption on an inert material acting as a support, it being possible for the latter to be in the form of a powder or of a sheet which is placed against the glass surfaces. The inert materials acting as support are neutral or very slightly acid mineral or vegetable products, such as sawdust and cellulose products.

In U.S. Pat. Spec. No. 3,723,312, an interleaving material is proposed which comprises a dedusted agglomerated organic acid, specifically salicylic acid, mixed with an inert particulate separating material such as wood flour, polystyrene or Lucite (a methyl methacrylate polymer), the particles of which are preferably smaller than the particles of the acid. It is stated in the U.S. Specification that acids impregnated into porous solid inert separator materials perform less suitably than agglomerated acids.

SUMMARY OF THE INVENTION

According to the present invention, an interleaving material for separating glass sheets and protecting them from scratching and staining comprises a porous finely divided support material, impregnated with a weakly acidic material, and fine particles of a chemically inert plastics material. Despite the teaching of the U.S. Pat. No. 3,723,312, it has been found that the interleaving material according to the invention works effectively to prevent or reduce both scratching and staining. It also has important practical advantages, in that it has better flow properties than an interleaving material containing agglomerated acid particles, being thus easier to handle and to distribute onto the glass surfaces. It is also believed that the acidic material with which the porous support material is impregnated is released during storage or transit in a more controlled manner than agglomerated acid, so providing more consistent protection to the glass surfaces over a period of time.

Furthermore, the use of the mixture of acid-impregnated porous support material and fine particles of chemically inert plastics material is found to protect the glass from transit damage much better than a similar porous support material alone, whether impregnated or not. It is believed that the incorporation of the fine particles of plastics material, acting as a separator material, improves the practical performance of the interleaving material because the plastics material is less liable to be displaced from between the sheets by chance air currents or gravity than the porous support material and it is also less liable to contain impurities which might damage the glass.

The term "weakly acidic material" is used herein to denote a weak organic acid, that is an organic acid which is only slightly dissociated in aqueous solution (see, for example, Textbook of Quantitative Inorganic Analysis by A.I. Vogel, 3rd Edition, published by Longmans, London, page 2) or an acid reacting salt, that is a salt which dissolves in water to give an acidic solution, for example ammonium chloride. The preferred organic acids are acids containing 3 to 10 carbon atoms, especially (i) dibasic aliphatic acids, for example adipic acid, maleic acid, sebacic acid and succinic acid and (ii) aromatic acids, for example benzoic acid and salicylic acid. If desired, a mixture of weakly acidic materials may be used. The weak organic acids used in the practice of the present invention have a first dissociation constant, measured at 25° C, in the range $1 \times 10^{-1}$ to $1 \times 10^{-7}$, the preferred organic acids having a first dissociation constant, measured at 25° C, in the range $5 \times 10^{-3}$ to $1 \times 10^{-6}$.

The porous support material may conveniently be a cellulose material of vegetable origin, e.g. coconut shell flour or a wood flour (e.g. Canadian hardwood wood flour) or mixtures thereof.

DETAILED DESCRIPTION OF THE INVENTION

The porous support material may be impregnated with the weakly acidic material by allowing the former to absorb a solution of the latter and evaporating the solvent. Aqueous, organic, or mixed aqueous and organic solvents may be used, as long as they dissolve the weakly acidic material. Sufficient solution should be used to achieve the required concentration of the weakly acidic material in the porous support material. To minimise the task of solvent removal, it is desirable to use a concentrated solution, preferably a saturated solution, of the weakly acidic material. Evaporation of the solvent may be effected under normal atmospheric temperature and pressure or may be assisted by the application of heat or of reduced pressure.

The chemically inert plastics material, which acts as a separator material, preferably has a particle size which is larger than that of the acid-impregnated porous support material. We have found that this is preferable because, if the particles of acid-impregnated support material are larger (as suggested by U.S. Pat.

No. 3,723,712), and particularly if the latter particles are soft, they produce marks by rubbing against the glass surface, giving an appearance of surface damage on the glass. Both components will generally have a particle size such that they will pass a 10 mesh (British Standard) sieve, and preferably a 30 mesh sieve, but will be retained on a 300 mesh sieve. The acid impregnated porous support material may have a particle size such that it will pass a 120 mesh (British Standard) sieve, for example.

The plastics separator material may be, for example, a thermoplastic homopolymer or copolymer, e.g. a polyethylene, polystyrene, polytetrafluoroethylene, or an acrylic polymer, e.g. a methacrylate polyester. If desired, a mixture of plastics separator materials may be used.

The proportions in which the acid-impregnated porous support material and the plastics separator material are mixed in the interleaving material will depend partly on the nature and concentration of the weakly acidic material used. Generally, a proportion of substantially 50:50 parts by weight will be satisfactory although a wide range of proportions, for example from 10:90 to 90:10 parts by weight may be used in particular applications. The proportion of weakly acidic material which is contained in the impregnated porous material will again depend on the nature of the weakly acidic material. In the case of adipic acid impregnating coconut shell flour, a proportion of between 5 and 20 parts by weight of adipic acid in the coconut shell flour has been found suitable.

The interleaving material may be applied to the glass in conventional manner, by means of powder applicators. It is generally used in an amount of between 0.05 and 1 gram, preferably 0.1 to 0.5 grams, per square foot of glass.

The invention also includes a process for protecting glass sheets from scratching and staining during storage or transport, comprising applying an interleaving material as described above to a major surface of one such sheet of glass and bringing a further sheet of glass into face to face relation with said major surface. It further includes a method of producing a stack of glass sheets, protected from scratching and staining by an interleaving material between the sheets, comprising repeating the said process to form the stack. Finally the invention comprehends a stack of glass sheets produced in this manner.

A specific embodiment of the invention will now be described in more detail by way of example.

EXAMPLE

In this embodiment, the porous finely divided support material was coconut shell flour which was impregnated with adipic acid. Impregnation was carried out by treating the coconut shell flour with a solution of adipic acid in methanol or in a mixture of water and methanol. The solvent, which was used in the minimum quantity required to achieve wetting of the coconut shell flour, was then removed by the use of reduced pressure, and elevated temperature. During the impregnation treatment, the materials were stirred continuously to achieve as uniform a treating as possible. When dry, the impregnated material was sieved through a 120 mesh (British Standard) sieve. The resultant impregnated material contained between 5 and 20% by weight of adipic acid. It was then mixed with powdered Lucite (a methyl methacrylate polymer) of slightly larger particle size, which would pass through a 30 mesh (British Standard) sieve. Both materials were retained on a 300 sieve. The interleaving material thus produced was applied by conventional powder applicators at a rate of 0.2 grams per square foot to the surfaces of glass sheets which were subsequently stacked and tested, firstly on a test rig which simulated relative movements which might occur in transit, and secondly on test rigs which simulated cold and hot humid conditions and cyclic heating and cooling in humid conditions. An effective degree of protection was found as regards scratching and staining of the sheets, as compared with control sheets having no interleaving material applied thereto.

The interleaving material was found easier to apply than similar materials containing agglomerated acids, and an even distribution was more readily obtained while the impregnation of the support material with the acidic material alleviated the problems of acid dust which had been previously experienced with a straight mixture of finely divided adipic acid with the other materials, namely Lucite and coconut shell flour.

Similar results were obtained when the adipic acid was replaced in turn by benzoic acid, maleic acid, sebacic acid and succinic acid.

We claim:

1. An interleaving material for separating glass sheets and protecting them from staining, comprising a porous finely divided support material, impregnated with a weak organic acid selected from the group consisting of dibasic aliphatic acids, aromatic acids and mixtures thereof, and fine particles of a chemically inert plastics material selected from the group consisting of a thermoplastic homopolymer of an ethylenically unsaturated monomer, a thermoplastic copolymer of ethylenically unsaturated monomers and mixtures thereof, the particle size of said plastics material being larger than that of said acid-impregnated porous support material and the particle sizes of both said plastics material and said support material being such that the particles will pass through a 10 mesh British Standard sieve but will be retained on a 300 mesh British Standard sieve, said plastics material and said acid-impregnated porous support material being present in relative proportions between 90:10 and 10:90 parts by weight.

2. A material according to claim 1 wherein the organic acid contains 3 to 10 carbon atoms.

3. A material according to claim 1, wherein the organic acid is adipic acid.

4. A material according to claim 1, wherein the organic acid is maleic acid.

5. A material according to claim 1, wherein the organic acid is sebacic acid.

6. A material according to claim 1, wherein the organic acid is succinic acid.

7. A material according to claim 1, wherein the organic acid is benzoic acid.

8. A material according to claim 1, wherein the porous support material is a cellulose material of vegetable origin.

9. A material according to claim 8, wherein the porous support material is coconut shell flour.

10. A material according to claim 8, wherein the porous support material is a wood flour.

11. A material according to claim 10, wherein the wood flour is a hardwood wood flour.

12. A material according to claim 1, wherein the porous support material and the plastics material both have a particle size such that they will pass a 30 mesh (British Standard) sieve.

13. A material according to claim 12, wherein the acidimpregnated porous support material has a particle size such that it will pass a 120 mesh (British Standard) sieve.

14. A material according to claim 1, wherein the plastics material is polyethylene.

15. A material according to claim 1, wherein the plastics material is polystyrene.

16. A material according to claim 1, wherein the plastics material is polytetrafluoroethylene.

17. A material according to claim 1, wherein the plastics material is a methacrylate ester polymer.

18. A material according to claim 17, wherein the plastics material is a methylmethacrylate polymer.

19. A material according to claim 1, wherein the acid-impregnated porous support material and the chemically inert plastics material are mixed in proportions of substantially 50:50 parts by weight.

20. A material according to claim 1, wherein the porous support material is coconut shell flour which is impregnated with between 5 and 20 parts by weight of adipic acid.

21. A process for protecting sheets of glass from scratching and staining during storage or transport, comprising applying an interleaving material according to claim 1 to a major surface of one such sheet of glass and bringing a further sheet of glass into face to face relation with said major surface.

22. A method of producing a stack of glass sheets, protected from scratching and staining by an interleaving material between the sheets, comprising repeating the process of claim 21 to form the stack.

23. A stack of glass sheets produced by the method according to claim 22.

24. A stack of glass sheets comprising a plurality of glass sheets in face to face relationship, the major surfaces of adjacent sheets in the stack being protected from scratching and staining by being separated by an interleaving material according to claim 1.

25. A material according to claim 1, wherein said weak organic acid has a first dissociation constant, measured at 25°C, in the range of $1 \times 10^{-1}$ to $1 \times 10^{-7}$.

* * * * *